United States Patent [19]

Rinaldi

[11] 4,308,235
[45] Dec. 29, 1981

[54] PORTABLE APPARATUS FOR WELDING BY MEANS OF AN OXI-GAS FLAME

[75] Inventor: Renato Rinaldi, Modena, Italy

[73] Assignee: B.B.R. Instruments S.r.L., Reggio Emilia, Italy

[21] Appl. No.: 46,959

[22] Filed: Jun. 8, 1979

[30] Foreign Application Priority Data

Jul. 13, 1978 [IT] Italy .............................. 40101 A/78

[51] Int. Cl.³ ................................................ B01J 8/02
[52] U.S. Cl. ............................ 422/211; 29/DIG. 38; 228/2.5; 228/219; 239/419; 422/187; 422/222; 422/306; 431/344; 431/354
[58] Field of Search ............... 422/129, 187, 211, 222, 422/306; 29/DIG. 38, DIG. 48; 228/2.5, 218, 219; 239/398, 418, 419; 431/114, 142, 344, 354

[56] References Cited

U.S. PATENT DOCUMENTS

| | | | |
|---|---|---|---|
| Re. 16,307 | 3/1926 | McCutcheon | 239/419 X |
| 3,019,197 | 1/1962 | Saunders | 422/222 X |
| 3,029,807 | 4/1962 | Webster | 431/344 X |
| 3,253,787 | 5/1966 | Stutzman | 239/419 X |
| 3,607,066 | 9/1971 | Basch et al. | 422/211 X |
| 3,724,444 | 4/1973 | Varona | 431/344 X |
| 3,732,060 | 5/1973 | Churchill et al. | 431/344 |
| 3,739,574 | 6/1973 | Godfrey | 422/211 X |
| 3,907,490 | 9/1975 | Schaller | 431/142 |
| 4,133,301 | 1/1979 | Fujiwara | 431/344 X |

*Primary Examiner*—Richard L. Chiesa
*Attorney, Agent, or Firm*—Brisebois & Kruger

[57] ABSTRACT

Portable apparatus for welding by means of an oxy-gas flame, such as an oxy-acetylene or an oxy-petroleum gas flame or the like, comprises a device for supplying the gaseous fuel in gaseous form under pressure, a combustion oxygen generator and means for pressuring said combustion oxygen generator so as to make the oxygen available at a pressure compatible with the fuel delivery pressure, these means being realized by a connection between the oxygen generator and the fuel supply device.

5 Claims, 3 Drawing Figures

PORTABLE APPARATUS FOR WELDING BY MEANS OF AN OXI-GAS FLAME

Welding and cutting are carried out at the present time using a suitable torch fed with a mixture of oxygen and an appropriate gaseous fuel, which can be acetylene, liquefied petroleum gas or the like.

The fuel is supplied either from a high pressure cylinder or from a suitable generator, which in the case of acetylene is fed with calcium carbide and water. The oxygen, which in reality is the indispensable means for attaining high temperature, is always supplied from a high pressure cylinder.

A high temperature welding torch always requires oxygen and is never self-contained, and in a certain sense forms a non-portable installation together with the cylinders or equipment for supplying the fuel and the combustion supporting oxygen.

This greatly limits the application of this type of very high temperature welding, of the order of 2000° C., because for obvious reasons the known apparatus are very bulky and cannot be made transportable.

This is due mainly to the need for providing a high pressure oxygen cylinder which is of large overall size, and is not always easy to obtain.

In clarifying the state of the art on which the present invention is based, it should be noted that there are methods for producing oxygen on the spot, such as hydrolysis of water, but these methods have so far not been used in welding, as the oxygen obtained is not of sufficient pressure for use for this purpose. This lack of pressure results in an insufficient mixing with the gaseous fuel, together with an insufficient gas throughput.

The object of the present invention is to provide an apparatus for welding by means of an oxy-gas flame, which is completely self-contained as regards its oxygen supply, and which can be fitted into a small sized container easily transportable by hand, such as a portable case. This object is attained according to the invention by a combination comprising an oxygen generator and a small pressurised cylinder of fuel gas; in this combination the entire oxygen generator operating under pressure, said pressure being obtained directly from the fuel gas cylinder. According to a further aspect of the invention, the oxygen generator is of the catalytic type. According to a further aspect of the invention, the fuel is liquefied petroleum gas, such as butane, propane or the like.

The apparatus according to the present invention can be constituted in practice by an oxygen generator based on the principle of continuously producing oxygen from hydrogen peroxide using a suitable catalyst. Said oxygen generator is combined with a fuel gas generator consisting simply of a small cylinder containing liquid gas (butane, propane of the like).

Obviously the liquid gas can be replaced by acetylene, methane, petrol or the like by suitable changing the fuel gas generator in known manner.

Various metal-based or ground glass-based substances can be used for decomposing the hydrogen peroxide to give pure oxygen. These processes are not described as they are known per se.

Thus whereas the invention preferably comprises a small cylinder with a pressure reducer for the fuel gas, it comprises an actual small plant for the oxygen, which is very economical and can be divided into the following parts:

1. A vessel for containing the hydrogen peroxide;
2. A vessel which acts as a reaction chamber for the exothermic decomposition of the hydrogen peroxide;
3. A vessel which acts as a condenser for the water vapour which is generated together with the oxygen in the reaction chamber;
4. One or more vessels in which the oxygen is scrubbed and further cooled by bubbling through water.

A cock and non-return valve together with a filter for the hydrogen peroxide are provided to enable the unit to operate both continuously and intermittently.

Further according to the invention, downstream of the pressure reducer through which the fuel gas cylinder supplies the torch, there is provided a branch connected to the vessel in which the oxygen is developed, so that this latter is available at the same pressure as the fuel.

Obviously as an alternative, the vessel in which the oxygen is developed can be pressurised using its own means, for example by means of a pump or a cylinder of compressed air of suitable pressure.

The objects and advantages of the invention together with its operational characteristics and constructional merits will be more apparent from the detailed description given hereinafter of one preferred embodiment thereof, illustrated by way of nonlimiting example in the accompanying drawings in which:

FIGS. 1 and 2 show that the apparatus according to the invention is contained in a portable metal case composed of a lower base (1) and an upper cover (2).

Figure 2:
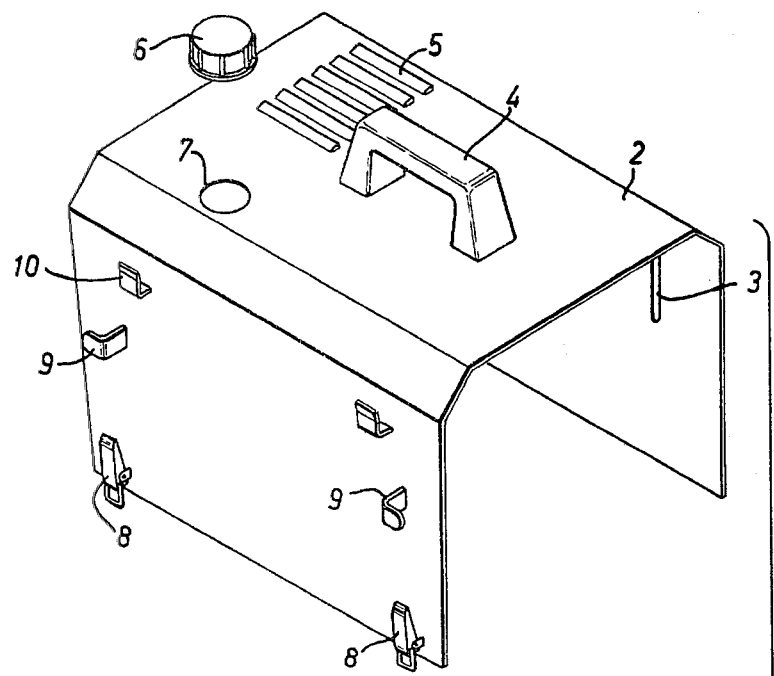
FIG. 2 is a rear exploded view of the portable case containing the apparatus according to the invention.
Figure 2:
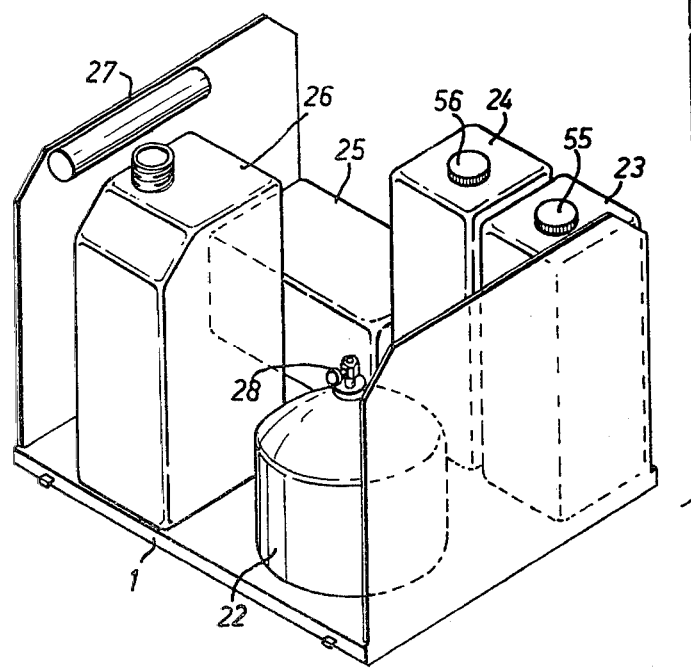

As can be clearly seen in FIG. 2, these two parts are both in the shape of a "U", upright for the base (1) and inverted for the cover (2), their vertical arms being orthogonal to each other so that when they are assembled together, these parts define a substantially parallelepiped closed container.

The opposing ends of the lower longitudinal edges of the cover (2) are provided with articulated hooks (8) for engaging with suitable projections branching from the bottom of the base (1).

Figure 1:
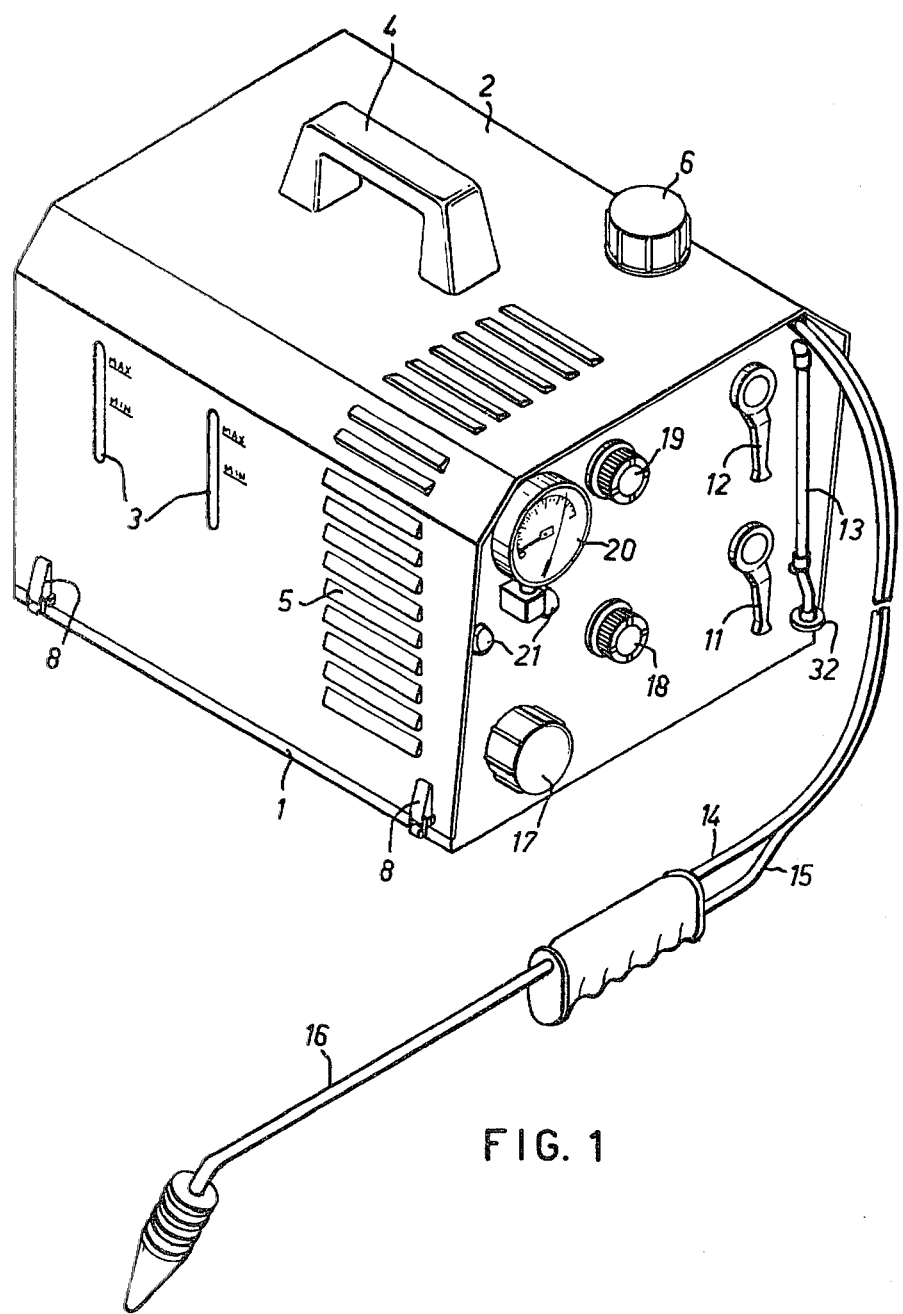
FIG. 1 is a front perspective view of the device according to the invention.

As shown in FIG. 1, one of the vertical walls of the base (1) defines a convenient instrument panel for monitoring and adjusting the correct operation of the apparatus according to the invention. At the top right hand corner of this instrument panel there are two through bores through which emerge a flexible hose (14) for the combustion supporting gas (oxygen) and a flexible hose (15) for a fuel gas, for supplying the torch (15). In proximity to this instrument panel, the cover (2) is provided with a cooling grid (5) which extends over both its upper wall and one of its side walls. This latter side wall of the cover (2) also comprises two vertical slots (3) which allow the water level to be determined in the pair of vessels (23) and (24) located inside the portable case which contains the apparatus. The upper wall of this cover (2) is also provided with a handle (4) for transporting the apparatus.

Again with reference to FIGS. 1 and 2, the upper wall of the cover (2) comprises a circular aperture (7)

for mounting over the nozzle or neck of a vessel (26) which is closed by a suitable cap (6).

On that side wall of the cover (2) which is opposite the wall comprising the two vertical slots (3), there are provided two hooks (9) around which the pair of flexible hoses (14) and (15) is wound, and a pair of brackets (10) for supporting the torch (16) when not in use.

On the upper horizontal edge of the inner wall of the instrument panel is fitted a cylindrical reaction chamber (27). A suitable quantity of lead dust or another equivalent catalyst is placed inside this chamber 27. A vessel (26) for containing hydrogen peroxide ($H_2O_2$) is disposed on the floor of the base (1) in proximity to the instrument panel, on the same side as that vertical wall of the cover (2) which carries the hooks (9) and brackets (10).

On the opposite side of the floor of base (1) there is disposed a chamber (25) for collecting the reaction products, and which terminates at the instrument panel by means of a discharge cap (17) as shown in FIG. 1. As shown in FIG. 2, at the rear of this collection chamber (25) there are two cooling vessels (23) and (24) connected in series, both of the bubble type. Water is present in these latter, and they are provided on their upper wall with a suitable cap, (55) and (56) respectively.

A cylinder of liquid gas (22) of the type normally used for camping and which is easily available commercially is disposed on the floor on the other side of the base (1). This liquid gas cylinder (22) is fitted with a cock or valve (28) at its top.

The purpose of the vertical slots (3) is now apparent, in that they allow the water level in the vessels (23) and (24) to be seen, these being advantageously constructed of a transparent synthetic material.

With reference to FIG. 1, the instrument panel comprises two level determination viewing means (21) for the hydrogen peroxide vessel (26) and the collection chamber (25) for the reaction products respectively.

A description is given hereinafter with reference to FIG. 3, of the connections between the various vessels disposed on the floor of the base 1. In this figure, the full line indicates the path or paths followed by the fuel gas.

The double dashed line indicates the path followed by the hydrogen peroxide, whereas the single dashed line indicates the path followed by the oxygen.

As previously stated, the gas generator of the apparatus according to the invention is constituted essentially of a cylinder (22) of the type normally used for camping, and containing a liquefied gas such as butane, propane or the like. A conduit (51) branches from the cock (28) of cylinder (22) and is connected to a pressure reducer (30), its adjustment knob (19) being located on the instrument panel of the apparatus.

A conduit (53) is connected from the pressure reducer (30) to a pressure gauge (20) which is also located on the instrument panel. A cock 66 is connected into the conduit (53), and its operating lever 12 is located on the instrument panel.

Immediately downstream of this cock (66), a conduit (52) branches from the conduit (53) and is connected to the top of the hydrogen peroxide vessel (26). A gas flow regulator (29), of which the knob (18) is located on the instrument panel as shown in FIG. 1, is connected into the conduit (53) downstream of the connection between this latter and the conduit (52). The flexible gas hose (15), the initial part of which comprises a suitable non-return valve (54), is connected to that portion of the conduit (53) between the gas regulator (29) and pressure gauge (20). A conduit (50) branches from the base of the hydrogen peroxide vessel (26), and is connected to a cock (67), its control lever (11) being located on the instrument panel.

Although not shown, the initial part of the conduit (50) located in the vessel (26) is provided with a suitable filter.

A conduit (49) is connected between the cock (67) and one end of the reaction chamber (27). A sized orifice (31) is fitted into the conduit (49) for the purpose of making the feed of hydrogen peroxide to the tubular reaction chamber (27) uniform.

As stated, the tubular reaction chamber (27) is filled with a suitable catalyst, which in this specific case is granulated lead.

A conduit (48) runs from the other end of the tubular reaction chamber (27) to the top of the collection chamber (25) for the reaction products. This latter comprises a discharge cap (17) located on the instrument panel. A conduit (47) runs from the top of the collection chamber (25) for the reaction products to the bottom of the cooling vessel (23). A conduit (46) runs from the top of this latter to the bottom of the cooling vessel (24).

Although not shown, that end of the conduit (47) disposed inside the cooling vessel (24) is provided with a suitable perforated cap, the purpose of which is to prevent the formation of large bubbles during bubbling of the oxygen, which would make the flame from the torch (16) either trembling or intermittent.

A conduit (45) runs from the top of the cooling vessel (24) to the upper end of a vapour condensation column (13) disposed on the side of the instrument panel is shown in FIG. 1.

Figure 3:
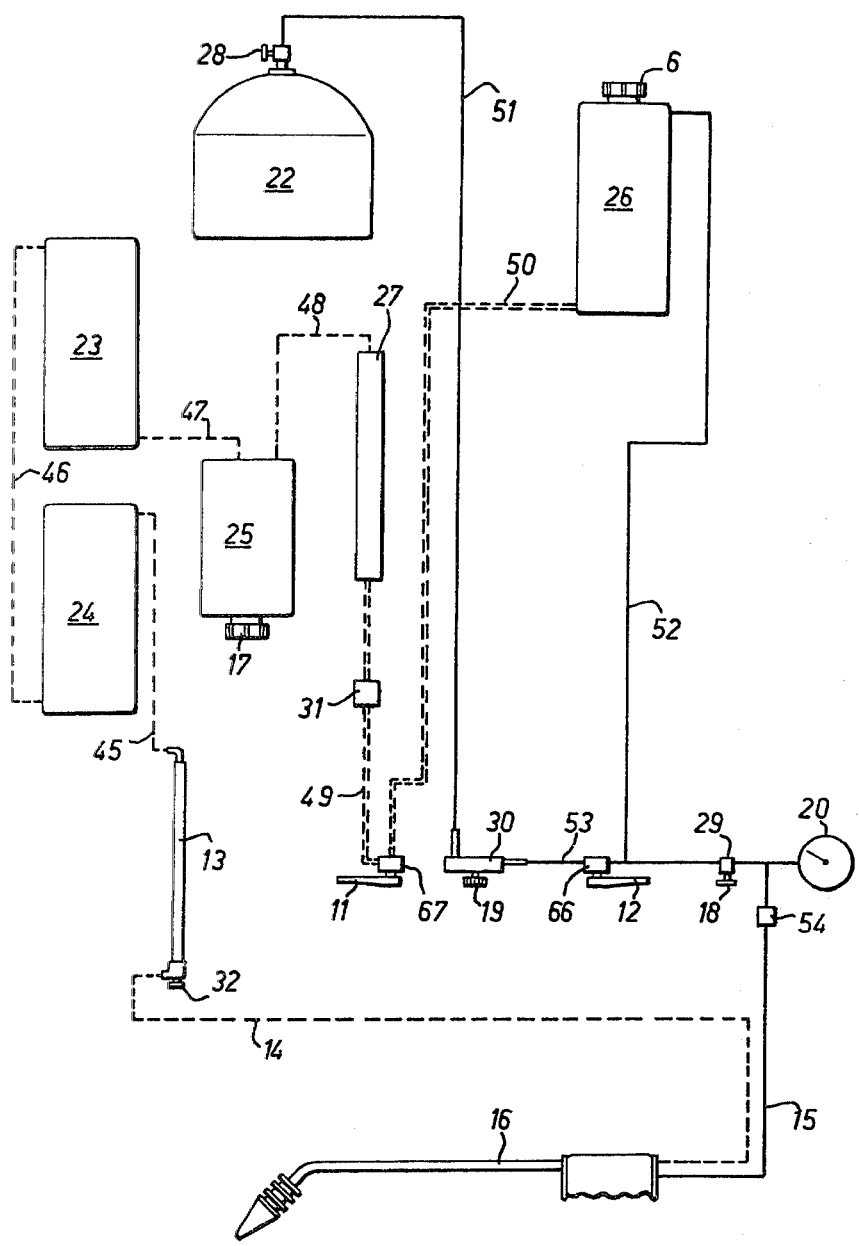
FIG. 3 is a schematic diagram showing the elements which make up the device according to the invention, and the connections between them.

As shown in FIGS. 1 and 3, the lower end of said vapour condensation column (13) is provided with a suitable emptying cap (32). The flexible hose (14) for feeding oxygen to the torch (16) is connected to the other end of the column (13).

The operation of the apparatus according to the invention is as follows.

The water level in the cooling vessels (23) and (24) is easily seen through the vertical slots (3) in the apparatus cover (2).

In addition, the viewing means (21) enable the level of the hydrogen peroxide in the vessel (26) and of the water in the collection chamber (25) for the reaction products to be determined.

The hydrogen peroxide level in the vessel (26) can be easily topped up through the nozzle closed by the cap (6). The water in the chamber (25) is discharged through the cap (17), and the vapour condensation column (13) is emptied by removing the cap (32).

The cooling vessels (23) and (24) are filled through the nozzles closed by the caps (55) and (56) after lifting the cover (2) off the base (1).

When the torch (16) is not in use, it is fitted on to the brackets (10), the flexible hoses (14) and (15) being wound over the hooks (9) on the cover (2).

When the apparatus according to the invention is to be used, the cocks (67) and (66) are firstly opened by the control levers (11) and (12), and the pressure reducer (30) and gas regulator cock (29) are then adjusted. This latter operation is necessary in order to suitably adapt the flame of the torch (16) to the type of work which the torch (16) is required to do. With this arrangement, the gas generator of the apparatus, in the form of the liquid gas cylinder (22), is able to pressurise the oxygen generator.

This is because the pressurised fuel gas is passed through the cock (28), the conduit (51), the pressure reducer (30), the cock (66) and the conduit (52) into the space above the level of the hydrogen peroxide in the vessel (26).

In this manner, the hydrogen peroxide is obliged to pass through the conduit (50) and through the cock (67) and conduit (49) into the tubular reaction chamber (27). The feed of this hydrogen peroxide into the tubular reaction chamber (27) is made uniform by the orifice (31).

Because of the lead catalyst, an exothermic decomposition reaction takes place inside the reaction chamber (27), by which the entering hydrogen peroxide is decomposed into two products, namely a liquid product (water) and a gaseous product (oxygen).

These two products are fed through the conduit (48) into the collection chamber (25) for the reaction products, from which the oxygen passes through the conduit (47) into the cooling vessel (23).

In this vessel, the oxygen undergoes a first cooling with simultaneous scrubbing, and then passes through the conduit (46) into the second cooling vessel (24) where it undergoes further cooling and further scrubbing.

The oxygen then passes through the conduit (45) and through the vapour condensation column (13) where any moisture still in suspension in the oxygen is retained.

From the outlet of the column (13), the oxygen is fed into the flexible hose (14) to supply the torch (16), which also receives the fuel gas fed through the flexible hose (15).

The invention is not limited to the single embodiment heretofore described, and modifications and improvements can be made thereto without leaving the scope of the inventive idea.

Thus, even though the fuel gas generator referred to is of the type indicated by (22), containing butane, propane or similar liquefied gases, it is apparent that this liquid gas can be replaced by acetylene, methane, petrol or similar fuels by modifying the fuel gas generator in a suitable manner using known means.

Moreover, although in this specific example, the hydrogen peroxide is decomposed in the tubular reaction chamber (27) using granulated lead, it is apparent that the pure oxygen can be produced using normally metal based substances other than the said lead.

Finally, although the pressure for the oxygen generator is preferably derived directly from the gas generator (22), said pressure can be obtained or derived from a system different from the gas generator, such as a pump or a pressure cylinder.

What is claimed is:

1. A portable apparatus for welding by means of an oxy-gas flame, comprising a device for supplying fuel in gaseous form under pressure, combustion oxygen generating means for generating oxygen at a pressure lower than the pressure of the fuel, and means connecting said device for supplying fuel to said oxygen generating means to pressurize the generated oxygen with said gaseous fuel so as to make the oxygen available at a pressure compatible with the fuel delivery pressure.

2. An apparatus as claimed in claim 1, wherein the fuel supply device is a cylinder of liquified petroleum gas.

3. A portable apparatus for welding by means of an oxy-gas flame, comprising a device for supplying fuel in gaseous form under pressure, a combustion oxygen generator comprising a vessel containing hydrogen peroxide $H_2O_2$, connected to a reaction chamber for the exothermic decomposition of the hydrogen peroxide, a condenser disposed downstream of the reaction chamber to separate water vapour from the oxygen, and at least one scrubber disposed downstream of the condenser to scrub and cool the oxygen, means for pressurizing said combustion oxygen generator from said device for supplying fuel so as to make the oxygen available at a pressure compatible with the fuel delivery pressure, and portable support means for supporting said oxygen generator and said device for supplying fuel.

4. Apparatus according to claim 3 wherein said portable support means comprises a portable cabinet.

5. Apparatus as claimed in claim 3 or claim 4 wherein the fuel supply comprises a cylinder containing a pressurized combustible gas.

* * * * *